United States Patent
Roth

(10) Patent No.: US 8,667,986 B2
(45) Date of Patent: Mar. 11, 2014

(54) PRESSURE-REGULATING VALVE FOR REGULATING THE PRESSURE IN A HIGH-PRESSURE FUEL ACCUMULATOR OF AN INTERNAL COMBUSTION ENGINE

(75) Inventor: Brigitte Roth, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 417 days.

(21) Appl. No.: 12/963,059

(22) Filed: Dec. 8, 2010

(65) Prior Publication Data

US 2011/0140016 A1 Jun. 16, 2011

(30) Foreign Application Priority Data

Dec. 8, 2009 (DE) .......................... 10 2009 047 649

(51) Int. Cl.
*F02M 33/02* (2006.01)
*F16K 31/02* (2006.01)

(52) U.S. Cl.
USPC ... 137/495; 137/508; 137/627.5; 251/129.18; 123/458

(58) Field of Classification Search
USPC .................. 137/627.5, 508, 495; 251/129.02, 251/129.14, 129.18, 210, 129.16; 123/510, 123/511, 458
See application file for complete search history.

(56) References Cited

U.S. PATENT DOCUMENTS

| | | | | |
|---|---|---|---|---|
| 1,649,900 A * | 11/1927 | Holdsworth | ............. | 251/129.02 |
| 2,050,853 A * | 8/1936 | Murphy | ................... | 137/115.14 |
| 2,257,702 A * | 9/1941 | Murphy | ................... | 137/115.14 |
| 4,192,343 A * | 3/1980 | Grahac | .......................... | 137/474 |
| 4,561,468 A * | 12/1985 | Kreitchman et al. | ...... | 137/625.5 |
| 4,753,263 A * | 6/1988 | Warrick | ...................... | 137/116.5 |
| 4,844,119 A * | 7/1989 | Martinic | .................. | 137/596.17 |
| 5,325,830 A * | 7/1994 | Hammer | .................. | 123/339.27 |
| 5,467,797 A * | 11/1995 | Seetharaman et al. | ... | 137/599.07 |
| 5,522,422 A * | 6/1996 | Beck | ............................ | 303/9.62 |
| 5,673,980 A * | 10/1997 | Schwarz et al. | ........... | 303/119.2 |
| 5,810,330 A * | 9/1998 | Eith et al. | ................. | 251/129.19 |
| 6,332,655 B1 * | 12/2001 | Kamiya et al. | ............. | 303/119.2 |
| 6,761,149 B2 * | 7/2004 | Frank | ............................. | 123/458 |
| 7,121,264 B2 * | 10/2006 | Frank et al. | .................... | 123/458 |
| 7,721,712 B2 * | 5/2010 | Bitter et al. | .................... | 123/458 |
| 7,921,827 B2 * | 4/2011 | Kobayashi et al. | ............ | 123/458 |
| 2007/0034819 A1 * | 2/2007 | Mitsumata et al. | ...... | 251/129.14 |
| 2009/0199820 A1 * | 8/2009 | Geyer | ............................ | 123/458 |
| 2011/0203682 A1 | 8/2011 | Ishikawa et al. | | |

FOREIGN PATENT DOCUMENTS

DE 10334615 2/2005
DE 102005061362 8/2007

* cited by examiner

*Primary Examiner* — John Rivell
(74) *Attorney, Agent, or Firm* — Michael Best & Friedrich LLP

(57) ABSTRACT

A pressure-regulating valve for regulating the pressure in a high-pressure fuel accumulator of an internal combustion engine, in particular in common-rail injection systems, with a valve piston (3) which is guided in an axially displaceable manner in a bore (1), is acted upon in the opening direction by the compressive force of a spring (2) and, when a magnet coil (4) is energized, undergoes an axial displacement in the direction of a first valve seat (5) counter to the compressive force of the spring (2) and counter to the pressure prevailing in the high-pressure fuel accumulator, wherein the valve piston acts on a valve-sealing element (6) which interacts with the valve seat (5).

12 Claims, 3 Drawing Sheets

PRESSURE-REGULATING VALVE FOR REGULATING THE PRESSURE IN A HIGH-PRESSURE FUEL ACCUMULATOR OF AN INTERNAL COMBUSTION ENGINE

BACKGROUND OF THE INVENTION

The invention relates to a pressure-regulating valve for regulating the pressure in a high-pressure fuel accumulator of an internal combustion engine, in particular in common-rail injection systems. A pressure-regulating valve of this type has a valve piston which is guided in an axially displaceable manner in a bore and acts on a valve-sealing element such that the valve-sealing element is pressed against a valve seat or can be raised from the valve seat in order to open the pressure-regulating valve. The adjusting pressure here is a function of the valve stroke. The axial displacement of the valve piston within the bore is brought about by a magnet coil which, upon being energized, moves the valve piston in the direction of the valve seat, i.e. in the closing direction. In the process, the compressive force of a spring which acts upon the valve piston in the opening direction is overcome.

Pressure-regulating valves for regulating the pressure in a high-pressure fuel accumulator and which are used in particular in common-rail injection systems have to meet certain safety requirements in order to protect people and the environment. For example, it has to be ensured that, in the event of errors in the control device and/or voltage supply, the pressure is limited to a permissible maximum limit value. Furthermore, in the event of a loss of voltage, for example if a cable breaks or due to damage by a marten, it should be ensured that rail pressure continues to be built up in order to permit an emergency running mode (what is referred to as the limp home function).

In the case of "currentlessly open" valves which are frequently used in common-rail injection systems of passenger vehicles, a pressure-limiting function can be realized in a simple manner by the valve opening when there is a loss of voltage. However, the open position of the valve when there is a loss of voltage has the consequence that it is generally not possible to build up a sufficient rail pressure in order to permit an emergency running mode.

The direction of action is the other way around in "currentlessly closed" valves. That is to say, the valve is closed when there is a loss of voltage. The closing of the valve is brought about by a powerful spring which acts upon the valve piston in the closing direction. The spring force of the spring is configured in such a manner that it permits adjustment of the valve piston counter to the pressure in the high-pressure fuel accumulator. In order to open the valve, a magnet coil, the magnetic force of which opposes the closing force of the spring, is energized. When there is a loss of voltage, a closed position of the valve and therefore an emergency running mode are therefore ensured. However, due to the failure of the regulating function, the pressure in the high-pressure fuel accumulator may rise in such a manner that the permissible system pressure is exceeded. Furthermore, the temperatures in the fuel return of the pressure-regulating valve may rise to values above 200° C. In the process, not only can the system components be damaged but people and the environment may also be put at risk. Currentlessly closed pressure-regulating valves, as are frequently used in common-rail injection systems of commercial vehicles, therefore regularly require the use of an additional pressure-limiting valve in order to meet the safety requirements.

Laid-open specification DE 103 34 615 A1 discloses a currentlessly open pressure-regulating valve of the type in question which, if an electromagnetic closing force fails, is intended to permit a minimum pressure at the valve outlet and therefore an emergency running mode. For this purpose, the opening cross section of the inlet of the pressure-regulating valve is configured in such a manner that the pressure-regulating valve opens only from a predetermined minimum fuel pressure. As an alternative, a throttle element is proposed in the region of the inlet in order to regulate a minimum pressure from which the pressure-regulating valve opens.

SUMMARY OF THE INVENTION

The present invention is based on the object of providing a pressure-regulating valve to regulate the pressure in a high-pressure fuel accumulator, said pressure-regulating valve also permitting an emergency running mode when there is a loss of voltage. Furthermore, a pressure-limiting function is intended to be realized. Finally, the proposed pressure-regulating valve is also intended to permit volume equalization when the engine is at a standstill.

The proposed pressure-regulating valve comprises a valve piston which is guided in an axially displaceable manner in a bore, is acted upon in the opening direction by the compressive force of a spring and, when a magnet coil is energized, undergoes an axial displacement in the direction of a first valve seat counter to the compressive force of the spring and counter to the pressure prevailing in the high-pressure fuel accumulator. In the process, the valve piston acts on a valve-sealing element which interacts with the valve seat. According to the invention, in order to realize emergency running, a second valve seat formed in a valve plate is provided, said second valve seat interacting with the valve-sealing element in such a manner that, when the magnet coil is not being energized, the pressure prevailing in the high-pressure fuel accumulator keeps the valve-sealing element in sealing contact with the second valve seat. The valve-sealing element in contact with the second valve seat ensures that, in the currentless state when the engine is running, the pressure-regulating valve is closed, and therefore a sufficient pressure can be built up in the high-pressure fuel accumulator, the pressure ensuring that injection takes place. In this case, the closing operation is not brought about via the valve piston but rather via the pressure in the high-pressure fuel accumulator. This is because, when the magnet coil is not being energized, the valve piston is not capable of keeping the valve-sealing element in contact with the first valve seat, and therefore the valve-sealing element lifts off from the first valve seat and fuel flows out of the high-pressure fuel accumulator via the first valve seat. The outflowing fuel in turn results in the valve-sealing element being pressed against the second valve seat, and therefore the fuel is prevented from flowing off further. The second valve seat is accordingly preferably arranged opposite the first valve seat, with a movement space for the valve-sealing element remaining between the two valve seats.

In order to realize a pressure-limiting function, it is furthermore proposed that the valve plate in which the second valve seat is formed is guided in an axially displaceable manner in the bore of the pressure-regulating valve and is acted upon in the direction of the first valve seat by the compressive force of a spring. In this case, the compressive force of the spring predetermines a maximum limit pressure, the exceeding of which leads to an axial displacement of the valve plate and therefore to the opening of the valve via the second valve seat. The valve-sealing element is not capable of following the axial displacement of the valve plate since the valve piston keeps the valve-sealing element in a position spaced apart from the second valve seat. A pressure-limiting function when the magnet coil is not being energized is therefore also ensured.

In order to realize a volume-equalizing function when the magnet coil is not being energized, the valve-sealing element is preferably arranged in a freely movable manner between the two valve seats. For this purpose, the two valve seats are preferably arranged coaxially and axially at a distance from each other, wherein the axial distance between the two valve seats defines the movement space of the valve-sealing element. The axial movement clearance of the valve-sealing element is limited only by an axial displacement of the valve piston when the magnet coil is energized in order to carry out the regulating function of the pressure-regulating valve. In this case, the valve-sealing element bears against the valve piston, and therefore the axial position of the valve-sealing element can be predetermined via the valve piston. If the valve-sealing element does not bear against either of the two valve seats, fuel can flow out of the high-pressure fuel accumulator via the first valve seat and can be supplied past the valve-sealing element via the second valve seat to a relief space or a return.

The valve plate which is guided in an axially displaceable manner in the bore of the pressure-regulating valve preferably has a central bore for receiving a subsection of the valve piston. The central bore is designed in such a manner that an axial displacement of the valve piston is ensured irrespective of the axial position of the valve plate. The same applies with regard to the valve plate which can move irrespective of the respective axial position of the valve piston. Therefore, in addition to the regulating function of the pressure-regulating valve, the safety functions—an emergency running mode and a pressure-limiting function—can also be realized. When the engine is at a standstill and when the magnet coil is not being energized, a volume-equalizing function is made possible at the same time by the valve-sealing element being able to move without restriction between the two opposite valve seats.

The valve plate which is guided in an axially displaceable manner in the bore of the pressure-regulating valve is furthermore preferably equipped with a bite-in edge for the sealing contact against a housing part or against a further valve plate of the pressure-regulating valve. The bite-in edge preferably delimits a first relief space which realizes a first equalization of the pressure when the pressure-regulating valve is opened via the first valve seat. If the pressure in the first relief space exceeds a maximum limit pressure which is predetermined via the compressive force of the spring acting on the valve plate, an axial displacement of the valve plate and therefore opening of the pressure-regulating valve via the second valve seat are brought about. The sealing seat formed via the bite-in edge of the valve plate therefore forms a pressure stage. This is because, when the pressure-limiting function is carried out, first of all the valve-sealing element lifts off the first valve seat and subsequently the valve plate which is guided in an axially displaceable manner lifts off from the housing part or from the further valve plate such that a first relief space is opened via the first valve seat and a further relief space, which is preferably connected to a return, is opened via the second valve seat. The valve-sealing element is capable of following the axial movement of the valve plate only until said valve-sealing element enters into contact with the valve piston. The sealing seat of the valve plate does not necessarily require the formation of a bite-in edge. The sealing seat can also be formed in a different way. However, a bite-in edge can be used for the radial delimitation of a relief space which at the same time provides an axial spacing between the two valve seats and therefore a movement clearance for the valve-sealing element.

If a further valve plate is provided, against which the valve plate which is guided in an axially displaceable manner bears, the first valve seat is preferably formed in the further valve plate. In order to form a sealing seat between the two valve plates, the further valve plate can also be equipped with a bite-in edge. The opposite valve seats which are preferably formed in the two valve plates can be designed as a flat seat or in conical form depending on the shape of the valve-sealing element. The shape of the opposite valve seats here may also differ.

According to a preferred embodiment, the valve-sealing element is designed as a ball. The ball shape ensures a consistent sealing contour irrespective of the position of the valve-sealing element. As an alternative, however, the valve-sealing element may also have a different geometry.

According to a further preferred embodiment, adjustment elements are furthermore provided, the adjustment elements preferably permitting an adjustment of the opening pressure, of the residual air gap and/or of the stroke stop. The adjustment elements are preferably in the form of a dial or an adjusting screw. An adjusting screw can be provided, for example, to adjust the axial position of a valve plate. The axial position of the valve piston can be adjusted advantageously via an adjusting screw. Accordingly, a dial of this type is preferably arranged in the bore of the pressure-regulating valve whereas the adjusting screw is preferably arranged on the cover in order to form a stroke stop for the valve piston.

Furthermore, provision is preferably made for the electric connections for energizing the magnet coil to likewise be arranged in the cover of the pressure-regulating valve.

BRIEF DESCRIPTION OF THE DRAWINGS

A preferred embodiment of the invention is explained in more detail below with reference to the attached drawings, in which.

DETAILED DESCRIPTION

Figure 1:
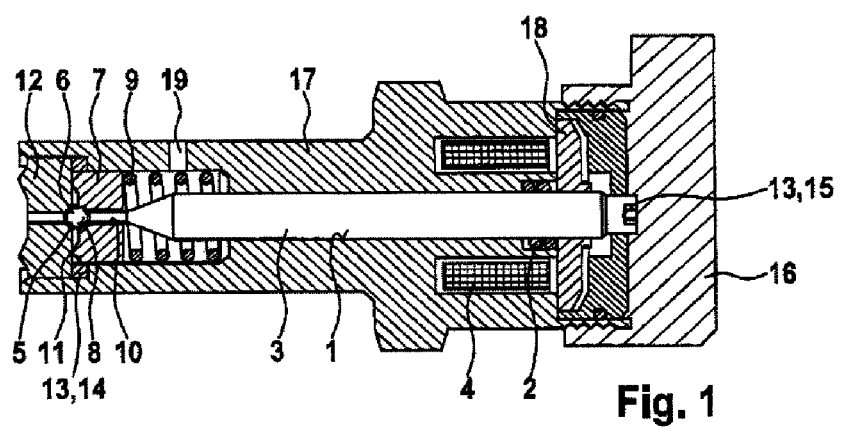
FIG. 1 shows a longitudinal section through a pressure-regulating valve according to the invention.

A design of a preferred exemplary embodiment of a pressure-regulating valve according to the invention can be gathered from the illustration of FIG. 1. A bore 1 in which a valve piston 3 is guided in an axially displaceable manner is formed within a housing 17. The housing 17 has a receiving space at one end for a magnet coil 4, which receiving space is closed by a cover 16. Upon being energized, the magnet coil 4 acts on an armature plate 18 which is connected fixedly to the valve piston 3. The axial displacement of the valve piston 3 is therefore brought about via the magnetic force of the magnet coil 4 which acts upon the valve piston 3 in the direction of a first valve seat 5. In the opposite direction, the valve piston 3 is acted upon by the compressive force of a spring 2 which is supported on one side on the housing and on the other side on the armature plate 18 of the valve piston 3. When the magnet coil 4 is not being energized, the spring 2 ensures that the valve piston 3 is reset in the direction of the cover 16. In this case, an adjusting screw 15 arranged on the cover forms a stroke stop for the valve piston 3. The stroke of the valve piston 3 can be adjusted by rotation of the adjusting screw 15.

The first valve seat 5 is formed in a valve plate 12 which is inserted into the bore 1 of the pressure-regulating valve. The axial position of the valve plate 12 within the bore 1 is adjusted via a dial 14. For this purpose, the dial 14 bears against a contact shoulder within the bore 1. A second valve seat 8 is formed in a valve plate 7 which is guided in an axially displaceable manner in the bore 1. The valve plate 7 is kept in contact with the valve plate 12 via the compressive force of a spring 9. For this purpose, the spring 9 is supported on a further contact shoulder within the bore 1. The valve plate 7 has a central bore 10 through which a subsection of the valve piston 3 is guided. The valve piston 3 acts by means of said subsection on a valve-sealing element 6 which is arranged in a freely movable manner between the valve seats 5 and 8. If, for example, the magnet coil 4 is energized, the valve piston 3 moves in the direction of the first valve seat 5, with that subsection of the valve piston 3 which is guided through the valve plate 7 entering into contact with the valve-sealing element 6 such that the latter is carried along. If the energizing is ended, the valve piston 3 is reset via the spring 2, and therefore the valve-sealing element 6 can move freely again between the two valve seats 5 and 8. The operation of the illustrated pressure-regulating valve is described below with reference to FIGS. 2-6.

Figure 2:
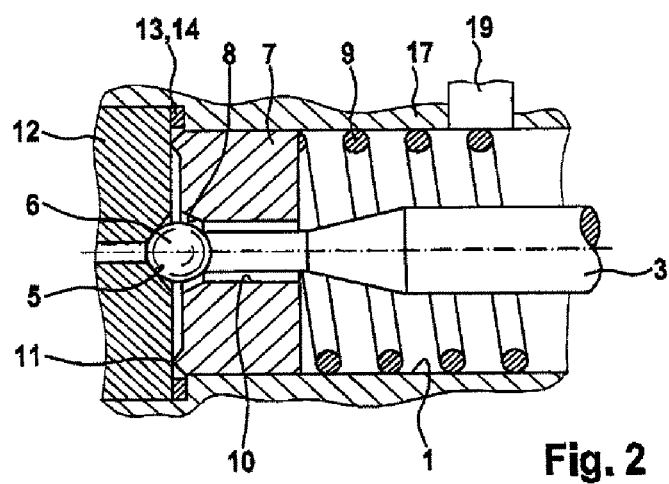
FIG. 2 shows the valve of FIG. 1 in the closed state.

In order to take up the closed position illustrated in FIG. 2, the magnet coil 4 has to be energized, with the magnetic force of the magnet coil 4 drawing the armature plate 18 onto the magnet coil 4 counter to the compressive force of the spring 2 and, in the process, moving the valve piston 3 in the direction of the first valve seat 5. In this case, the valve piston 2 presses the valve-sealing element 6 against the first valve seat 5. The pressure-regulating valve is therefore closed. In order to keep the valve-sealing element 6 in contact with the first valve seat 5, the magnetic force has to be dimensioned to be of a sufficient magnitude. This is because the pressure prevailing in the high-pressure fuel accumulator bears against the valve-sealing element 6 via the valve seat 5.

It can be gathered from FIG. 2 that, in the present case, the valve-sealing element 6 is in the form of a ball and that subsection of the valve piston 3 which acts on the valve-sealing element 6 is formed on the end side in a manner corresponding to the ball shape, thus providing optimum guidance of the valve-sealing element 6 by the valve piston 3. FIG. 2 furthermore shows a valve seat 5 which is of conical design, and therefore a narrow, annular sealing contour is formed when the valve-sealing element 6 bears against the valve seat 5. An inlet which connects the pressure-regulating valve to the high-pressure fuel accumulator furthermore opens into the region of the valve seat 5. The valve seat 8 which lies opposite the valve seat 5 is likewise of conical design and continues in the central bore 10 of the valve plate 7 through which the valve piston 3 is guided. In addition, the valve plate 7 is supported on the valve plate 12 via a bite-in edge 11 such that a movement space for the valve-sealing element 6 remains between the two valve seats 5 and 8.

Figure 3:
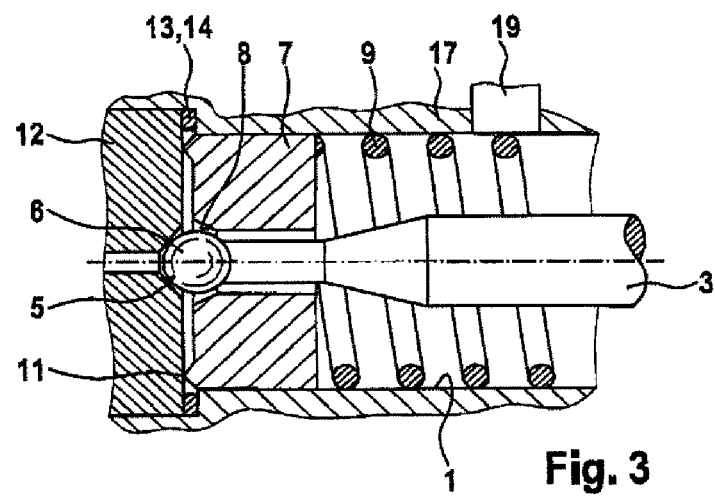
FIG. 3 shows the valve of FIG. 2 in the regulating function.

The movement space present between the two valve seats 5 and 8 ensures the regulating function of the pressure-regulating valve, which regulating function is illustrated in FIG. 3. For this purpose, the energizing of the magnetic coil 4 is changed in such a manner that the valve-sealing element 6 can lift off from the first valve seat 5 in the valve plate 12. The stroke is determined via the axial position of the valve piston 3. The valve-sealing element is held here in a position between the first valve seat 5 and the second valve seat 8 via the valve piston 3. The fuel flowing out of the fuel accumulator via the first valve seat 5 can be supplied around the valve-sealing element into a return 19 via the central bore 10 in the valve plate 7.

Figure 4:
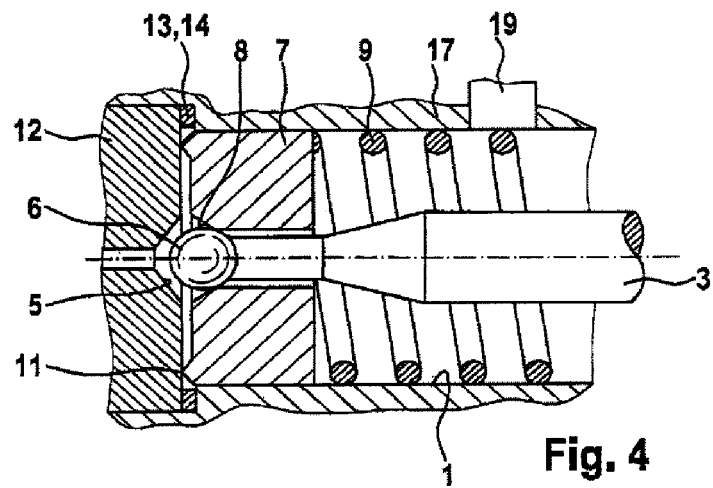
FIG. 4 shows the valve of FIG. 1 in the limp home function.

When the magnet coil 4 is not being energized, the valve piston 3 is pressed back via the compressive force of the spring 2 as far as the stop on the adjusting screw 15. The valve-sealing element 6 can accordingly move again freely between the valve seats 5 and 8, wherein the movement of the valve-sealing element 6 is determined by the pressure conditions prevailing in each case. Since, in the currentless state, the pressure prevailing in the high-pressure fuel accumulator is not opposed by any counter pressure, fuel is capable of flowing out of the fuel accumulator via the valve seat 5. The fuel flowing out presses the valve-sealing element 6 against the second valve seat 8 in the valve plate 7 such that the pressure-regulating valve is closed again. This state is illustrated in FIG. 4. Accordingly, it is ensured by the valve-sealing element 6 in contact with the second valve seat 8 that a pressure can build up in the high-pressure fuel accumulator, said pressure permitting injection operations and therefore an emergency running mode.

Figure 5:
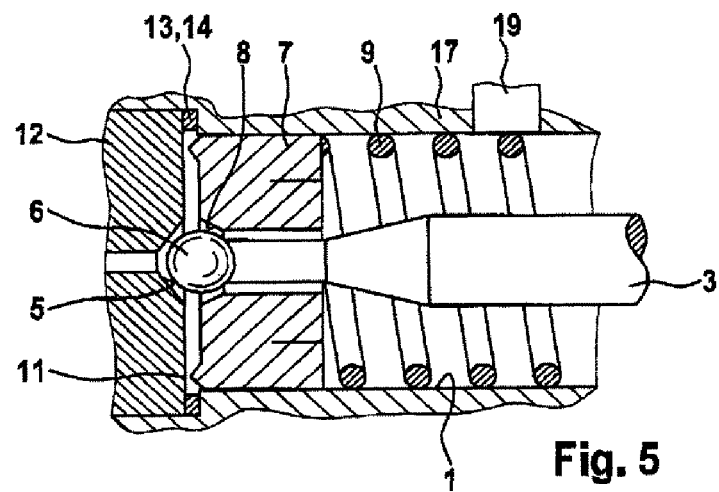
FIG. 5 shows the valve of FIG. 1 in the pressure-limiting function.

If the pressure in the emergency running mode exceeds the maximum limit pressure predetermined by the spring 9, the valve plate 7 is displaced axially counter to the compressive force of the spring 9, with the valve plate 7 first of all lifting off from the valve plate 12 and opening a first sealing seat formed via the bite-in edge 11. Since the valve-sealing element 6 only moves at the same time until bearing against the valve piston 3, the further axial displacement of the valve plate 7 causes the valve seat 8 to be opened. This state is illustrated in FIG. 5. The axial displacement of the valve plate 7 therefore ensures a pressure-limiting function which prevents the rail pressure from rising above a permissible maximum limit pressure.

Figure 6:
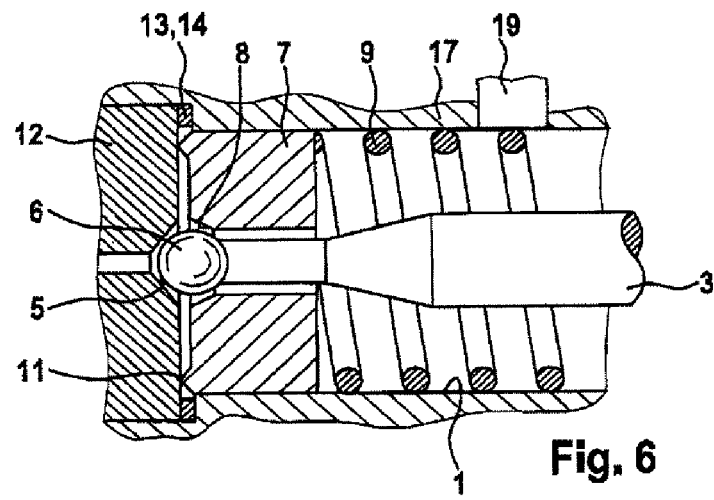
FIG. 6 shows the valve of FIG. 1 in the volume-equalizing function.

When the engine is at a standstill, the fuel in the high-pressure fuel accumulator can cool and accordingly the volume of said fuel can be reduced such that the pressure in the high-pressure region drops below the pressure in the low-pressure region. In this case, it is worth providing volume equalization. As illustrated in FIG. 6, when the magnet coil 4 is not being energized, the valve-sealing element 6 is capable of moving freely between the valve seats 5 and 8. In the process, the valve-sealing element 6 takes up a position between the two valve seats 5 and 8 such that fuel can flow out of the low-pressure region back into the high-pressure region via the valve seat 8. A volume-equalizing function is therefore also ensured.

Adjustment elements 13 can be provided to adjust the pressure-regulating valve. For this purpose, the illustrated pressure-regulating valve comprises a dial 14 and an adjusting screw 15. Furthermore, further adjusting elements 13 can be provided.

The pressure-regulating valve according to the invention is suitable in particular for use in common-rail injection systems for commercial vehicles, in which currentlessly closed valves are generally used in order to realize a limp home function. In the event of an error, for example when there is a loss of voltage, a cable break or ECU recovery, an emergency running mode is accordingly generally ensured. To limit the pressure, a pressure-limiting valve is additionally used. The proposed pressure-regulating valve according to the invention makes the use of additional pressure-limiting valve unnecessary, and therefore is suitable in particular for use in commercial vehicles. However, a sphere of use of a pressure-regulating valve according to the invention is not restricted thereto.

The invention claimed is:

1. A pressure-regulating valve for regulating the pressure in a high-pressure fuel accumulator of an internal combustion engine, the pressure-regulator valve comprising a valve piston (3) which is guided in an axially displaceable manner in a bore (1), is acted upon in the opening direction by the compressive force of a spring (2) and, when a magnet coil (4) is energized, undergoes an axial displacement in the direction of a first valve seat (5) counter to the compressive force of the spring (2) and counter to the pressure prevailing in the high-pressure fuel accumulator, wherein the valve piston acts on a valve-sealing element (6) which interacts with the valve seat (5), characterized in that, in order to realize emergency running, a second valve seat (8) formed in a valve plate (7) is provided, said second valve seat interacting with the valve-sealing element (6) in such a manner that, when the magnet coil (4) is not being energized, the pressure prevailing in the high-pressure fuel accumulator keeps the valve-sealing element (6) in sealing contact with the second valve seat (8),
 characterized in that the valve plate (7) is equipped with a bite-in edge (11) for the sealing contact against a housing part or against a further valve plate (12) of the pressure-regulating valve, and
 characterized in that the first valve seat (5) is formed in the further valve plate (12).

2. A pressure-regulating valve according to claim 1, characterized in that the valve-sealing element (6) is a ball.

3. A pressure-regulating valve according to claim 1, characterized in that adjustment elements (13) are provided, the adjustment elements permitting the adjustment of an opening pressure, of a residual air gap and/or of a stroke stop.

4. A pressure-regulating valve according to claim 1, characterized in that a cover (16) includes electric connections for energizing the magnet coil (4).

5. A pressure-regulating valve according to claim 3 wherein the adjustment elements are in the form of a dial (14) or an adjusting screw (15).

6. A pressure-regulating valve for regulating the pressure in a high-pressure fuel accumulator of an internal combustion engine, the pressure-regulator valve comprising a valve piston (3) which is guided in an axially displaceable manner in a bore (1), is acted upon in the opening direction by the compressive force of a spring (2) and, when a magnet coil (4) is energized, undergoes an axial displacement in the direction of a first valve seat (5) counter to the compressive force of the spring (2) and counter to the pressure prevailing in the high-pressure fuel accumulator, wherein the valve piston acts on a valve-sealing element (6) which interacts with the valve seat (5), characterized in that, in order to realize emergency running, a second valve seat (8) formed in a valve plate (7) is provided, said second valve seat interacting with the valve-sealing element (6) in such a manner that, when the magnet coil (4) is not being energized, the pressure prevailing in the high-pressure fuel accumulator keeps the valve-sealing element (6) in sealing contact with the second valve seat (8),
 characterized in that, in order to realize a pressure-limiting function, the valve plate (7) is guided in an axially displaceable manner in the bore (1) and is acted upon in the direction of the first valve seat (5) by the compressive force of an additional spring (9) such that exceeding a maximum limit pressure predetermined via the compressive force of the additional spring (9) leads to an axial displacement of the valve plate (7) and to the opening of the valve via the second valve seat (8),
 characterized in that, in order to realize a volume-equalizing function when the magnet coil (4) is not being energized, the valve-sealing element (6) is arranged in a freely movable manner between the two valve seats (5, 8), and
 characterized in that the valve plate (7) has a central bore (10) for receiving a subsection of the valve piston (3).

7. A pressure-regulating valve according to claim 6, characterized in that the valve plate (7) is equipped with a bite-in edge (11) for the sealing contact against a housing part or against a further valve plate (12) of the pressure-regulating valve.

8. A pressure-regulating valve according to claim 7, characterized in that the first valve seat (5) is formed in the further valve plate (12).

9. A pressure-regulating valve according to claim 8, characterized in that the valve-sealing element (6) is a ball.

10. A pressure-regulating valve according to claim 9, characterized in that adjustment elements (13) are provided, the adjustment elements permitting the adjustment of an opening pressure, of a residual air gap and/or of a stroke stop.

11. A pressure-regulating valve according to claim 10, characterized in that a cover (16) includes electric connections for energizing the magnet coil (4).

12. A pressure-regulating valve according to claim 10 wherein the adjustment elements are in the form of a dial (14) or an adjusting screw (15).

* * * * *